United States Patent [19]
Moon

[11] Patent Number: 5,877,817
[45] Date of Patent: Mar. 2, 1999

[54] DIGITAL SATELLITE BROADCAST RECEIVER HAVING SIMULTANEOUS MULTI-CHANNEL SEARCH FUNCTION, AND CONTROL METHOD THEREFOR

[75] Inventor: Sung Ho Moon, Kyongki-do, Rep. of Korea

[73] Assignee: Samsung Electro-Mechanics Co., Ltd., Rep. of Korea

[21] Appl. No.: 701,961

[22] Filed: Aug. 23, 1996

[30] Foreign Application Priority Data

May 28, 1996 [KR] Rep. of Korea ............... 1996-18173

[51] Int. Cl.$^6$ .................................................. H04N 5/445
[52] U.S. Cl. ........................ 348/564; 348/567; 348/588
[58] Field of Search .................................. 348/563, 564, 348/565, 567, 569, 588, 725, 731, 732, 734; H04N 5/445, 9/74, 5/45

[56] References Cited

U.S. PATENT DOCUMENTS

| | | |
|---|---|---|
| 5,351,130 | 9/1994 | Dugan et al. ............................ 348/725 |
| 5,353,121 | 10/1994 | Young et al. ........................... 348/563 |
| 5,534,942 | 7/1996 | Beyers, Jr. . |
| 5,694,176 | 12/1997 | Bruette . |
| 5,708,961 | 1/1998 | Hylton . |

FOREIGN PATENT DOCUMENTS 6-217231  8/1994  Japan .

*Primary Examiner*—Sherrie Hsia
*Attorney, Agent, or Firm*—Ladas & Parry

[57] ABSTRACT

A digital satellite broadcast receiver having a simultaneous multi-channel search function is disclosed, in which the currently broadcasting programs on the respective channels are displayed onto a plurality of divided windows respectively through one transponder, thereby providing a convenience to the channel search of the users. The number of the channels is detected by utilizing the program specific information (PSI) of the transport stream which is transmitted from a satellite. The screen is divided into as many as the number of the channels so as to set windows. Then the coding type of the picture header which is contained in the transport stream is read to detect the I picture. Then the I pictures of the relevant channels are displayed onto the respective divided windows. Then if the user selects one channel from among the displayed channels, then the selected picture is displayed in the original size.

3 Claims, 4 Drawing Sheets

DIGITAL SATELLITE BROADCAST RECEIVER HAVING SIMULTANEOUS MULTI-CHANNEL SEARCH FUNCTION, AND CONTROL METHOD THEREFOR

BACKGROUND OF THE INVENTION

1. Field of the invention

The present invention relates to a digital satellite broadcast receiver. In particular, the present invention relates to a digital satellite broadcast receiver having a simultaneous multi-channel search function, in which the currently broadcasting programs on respective channels are displayed in respective windows on a screen, thereby providing a convenience to the channel search of the user.

2. Description of the prior art

Generally, broadcasting video signals which are transmitted from a satellite are compressed in the MPEG II (Moving Picture Experts Group) way. The transport stream which is transmitted from a satellite contains individual video and audio data streams in its transmitted data. Further, it contains program specific information (PSI) which informs as to which program should be selected from among a plurality of programs, as to which packet is taken, and as to how the packet can be decoded.

Conventionally, a digital satellite video receiver is provided with an on-screen display (OSD) function, and the program information loaded on the PSI data is displayed in letters on the OSD, so that the users can obtain information on the programs to be broadcasted. A typical example of this is disclosed in U.S. Pat. No. 5,353,121.

However, in the conventional method in which the program information is provided in letters, the letters give an insufficient sense for the reality. Further, the watcher has to search for the letters to confirm as to whether the desired program is being broadcasted, and then, the watcher has to switch the channel again. Consequently, the inconvenience of the watcher is increased.

SUMMARY OF THE INVENTION

The present invention is intended to overcome the above described disadvantages of the conventional technique.

Therefore, it is an object of the present invention to provide a digital satellite broadcast receiver having a simultaneous multi-channel search function, in which the currently broadcasting programs on respective channels are displayed in respective windows on a screen, so that a user can search the channels at the same time.

It is another object of the present invention to provide a digital satellite broadcast receiver having a simultaneous multi-channel search function, in which a user can search a plurality of channels at one time, and can watch them simultaneously.

In achieving the above objects, a digital satellite broadcast receiver having a simultaneous multi-channel search function according to the present invention includes: a channel section for channel-selecting and receiving radio frequency signals from a satellite, and for converting the received radio frequency signals to digital signals, so as to output a transport stream in the form of MPEG II data; a demultiplexer for extracting a program specific information (PSI) from among the data inputted through the channel section, so as to select and output video data of arbitrary channels in a sequential and repetitive manner; a video decoder for selecting only I picture data from among the video data of the demultiplexer; a first memory section for storing the I picture data of the video decoder; a video encoder for converting the decoded video data of the video decoder to TV signals; a control section for dividing the pictures into as many as that shown in the program specific information of the demultiplexer, for controlling so as to display the respective I pictures of the first memory section onto the divided respective windows, and for controlling so as to display the cursor-located window program among the plurality of the windows onto the total picture upon encountering a channel switch key input; a second memory section for storing a management program and control data of the control section; and a remote interface section for receiving command data from a remote hand set of a user, so as to output it to the control section.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENT

Figure 1:
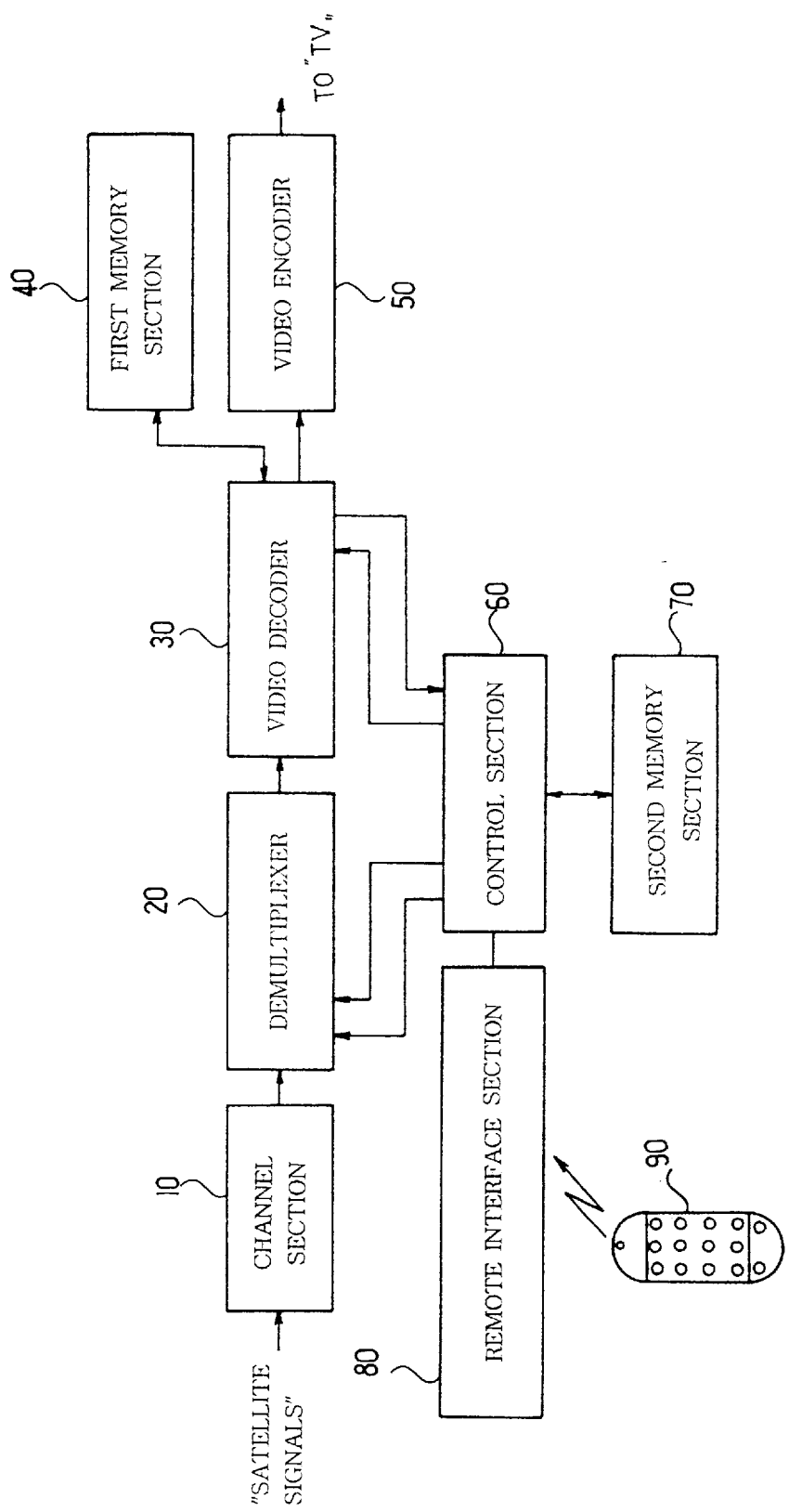
FIG. 1 is a block diagram showing the constitution of the digital satellite broadcast receiver according to the present invention.

FIG. 1 is a block diagram showing the constitution of the digital satellite broadcast receiver according to the present invention;

Referring to FIG. 1, the digital satellite broadcast receiver having a simultaneous multi-channel search function according to the present invention includes: a channel section 10 for channel-selecting and receiving radio frequency signals from a satellite and for converting the received radio frequency signals to digital signals, so as to output a transport stream in the MPEG II method; a demultiplexer 20 for extracting program specific information (PSI) from the transport stream so as to select and output video data of channels in a sequential and repetitive manner; a video decoder 30 for selecting and decoding only I picture data from among the video data of the demultiplexer 20; a first memory section 40 for storing the I picture data of the video decoder 30; a video encoder 50 for converting the decoded video data of the I picture decoder 30 into TV signals; a control section 60 for dividing a screen into as many windows as there are channels in the video data output of the demultiplexer 20 so as to display I pictures of the I picture data of the first memory section respectively in the windows, and for controlling so as to display the cursor-located window program among the plurality of the windows onto the total screen upon encountering a channel switch key input; a second memory section 70 for storing a management program and control data of the control section 60; and a remote interface section 80 for receiving command data from a remote hand set 90 of a user, so as to output it to the control section 60.

Referring to FIG. 1, the broadcasting signals which are transmitted from a satellite are received through an antenna and an LNB (low noise blockdown converter) to the channel section 10. The control section 60 controls the channel section 10 upon receipt of a transponder selecting command through the remote hand set 90 and the remote interface section 80 from the user. The channel section 10 which is controlled channel-selects the broadcasting signals of a particular frequency band from among the broadcasting signals of the transponder which has been selected by the user through the remote hand set 90 and the remote interface section 80. Then the channel section 10 outputs the selected transport stream to the demultiplexer 20 in the form of MPEG II data.

The demultiplexer 20 outputs the PSI data to the control section 60 within the transport stream. The transport stream generally contains 6 to 10 program channels, and the demultiplexer 20 selects video data of an arbitrary program channel from among them, so as to output it to the video decoder 30.

The control section 60 controls in such a manner that the screen should be divided into as many as the number of the program channels which appear in the program specific information (PSI). Further, the control section 60 controls in such a manner that the demultiplexer 20 should divide the video data of the arbitrary program channels. Thus the video data of the arbitrary program channels which are outputted from the demultiplexer 20 are inputted into the video decoder 30.

The control section 60 controls the video decoder 30, so that the picture coding type of the picture header among the inputted video data can be read, and that only the I picture data would be outputted to the first memory 40. The I picture data of the channels which are thus selected are stored into the relevant area of the first memory section 40 in a sequential manner.

Further, under the control of the control section 60, the video decoder 30 reads and decodes the I picture data which have been stored in the particular area of the first memory section 40, and then, outputs the decoded data to the video encoder 50. The video encoder 50 converts the inputted video digital signals into TV signals based on the NTSC method or the PAL method.

The control section 60 controls the demultiplexer 20 in such a manner that, in accordance with the inputted PSI, the video data of the currently broadcasting program channels should be selected in a sequential and repetitive manner.

Thus the video data which are sequentially and repetitively selected and outputted by the demultiplexer 20 are decoded by the video decoder 30, and then, are displayed onto the divided windows of the TV screen.

Figure 2:
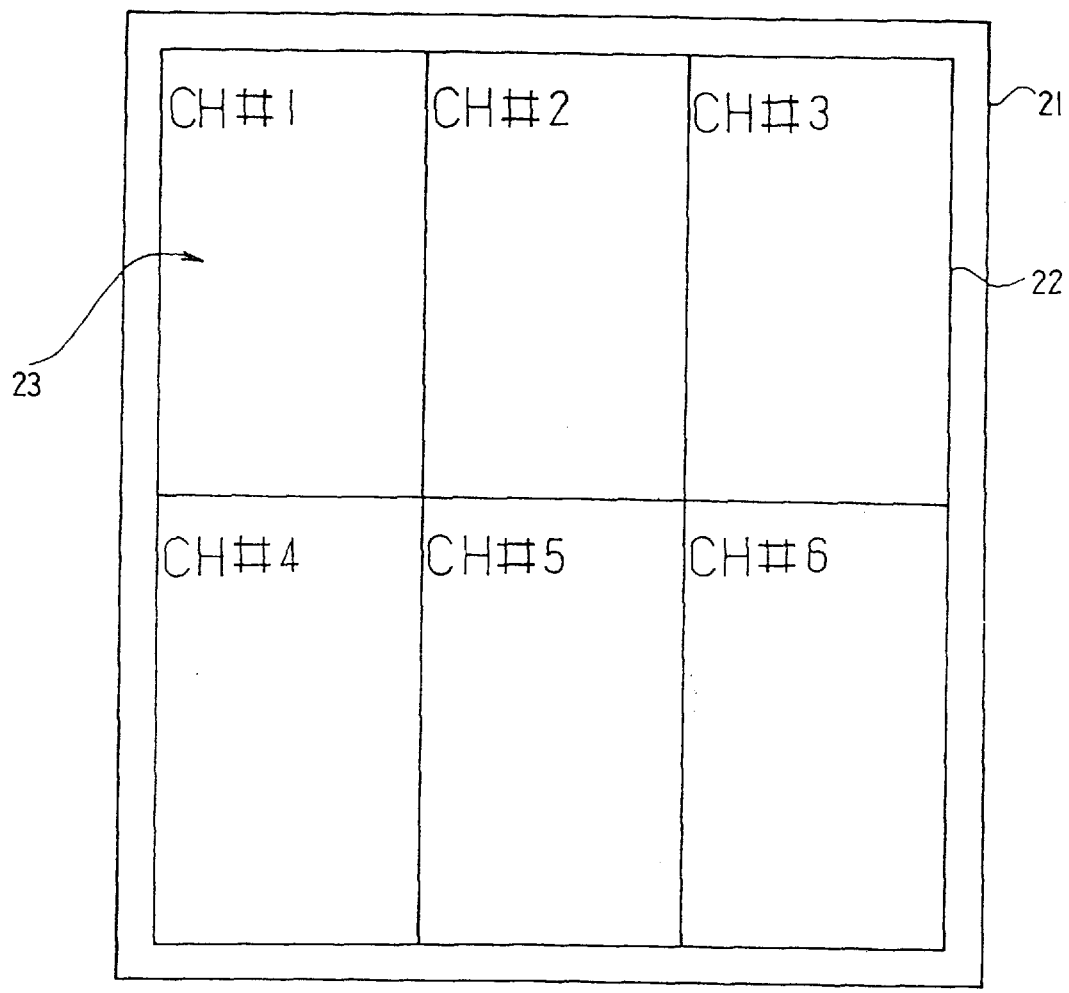
FIG. 2 is an example of divided TV pictures, divided into 6 windows according to the present invention.

FIG. 2 is an example of divided TV pictures, divided into 6 windows according an example of the present invention.

Windows 22 which are divided into 6 are displayed on the TV screen, and a first window (CH #1) displays the pictures of the program which is being currently broadcasted at the first channel. A second window (CH #2) displays those of the second channel, a third window (CH #3) displays those of the third channel, and so on. Finally the sixth window (CH #6) displays the pictures of the program which is being currently broadcasted in the 6th channel.

The number of the windows can be more or less. In the case where the number of the windows is increased, the area of each window is reduced. On the other hand, in the case where the number of the windows is decreased, the area of each of the windows is expanded.

As shown in FIG. 2, in the case where a channel switch key is inputted through the remote hand set 90 in a state with the cursor 23 located on a window displaying a particular program channel, the control section 60 displays the program channel of the relevant window onto the total screen 21.

Figure 3A:
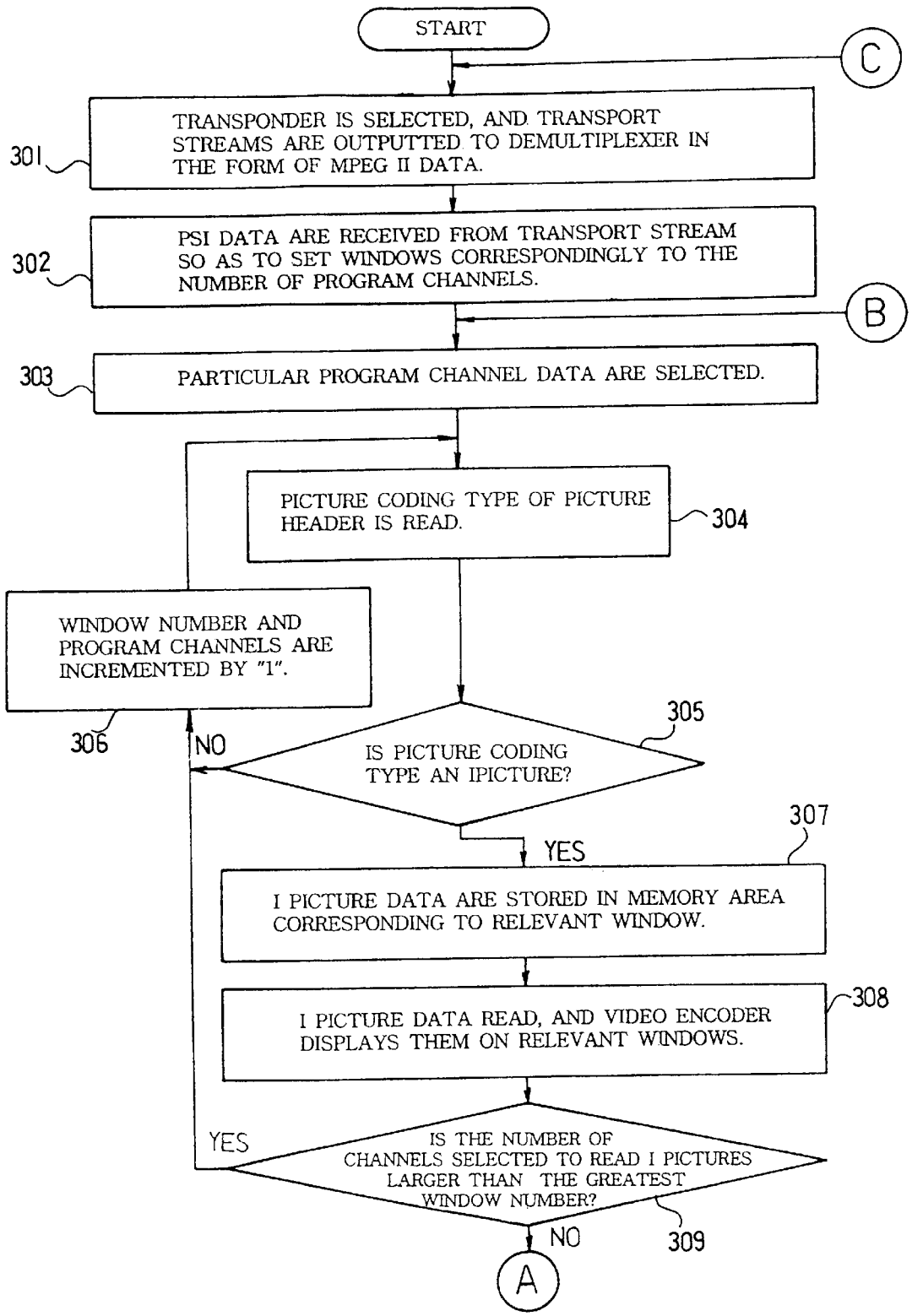
FIGS. 3A and 3B are flow charts showing the control method for a digital satellite broadcast receiver having a simultaneous multi-channel search function according to the present invention.
Figure 3B:
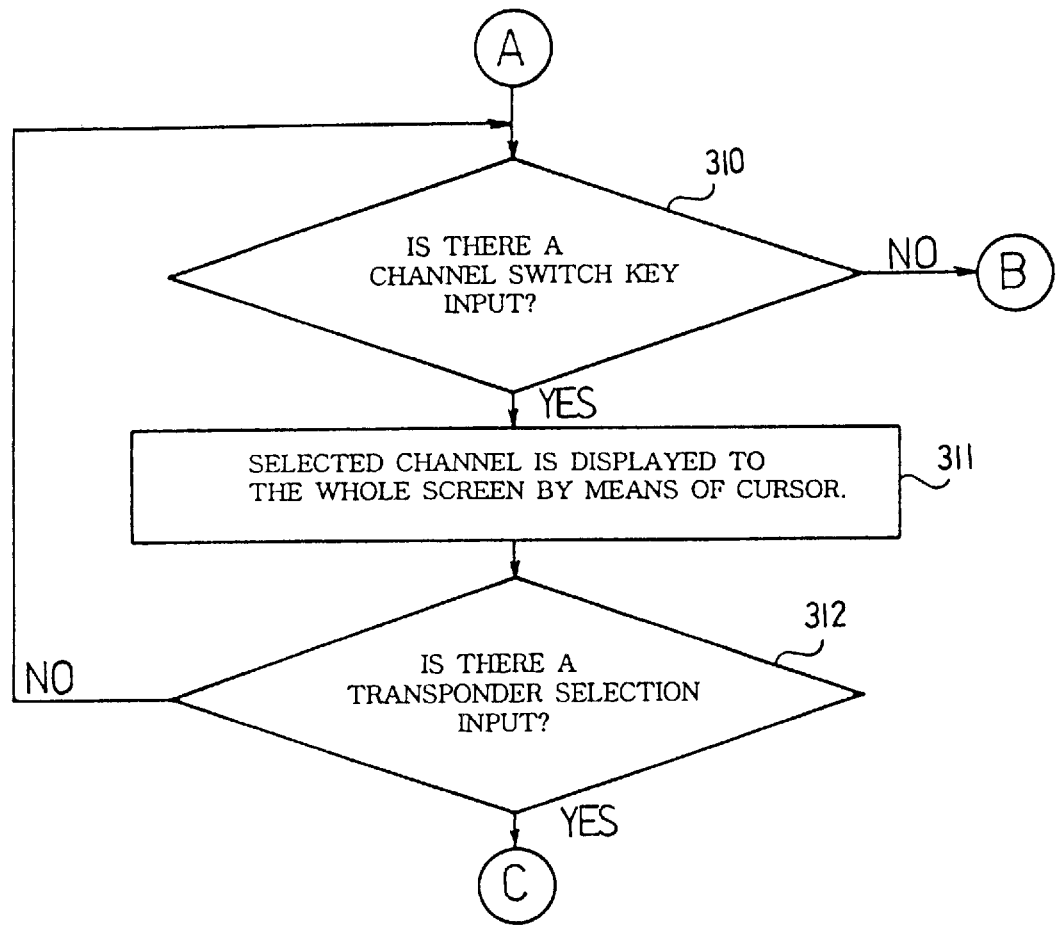

FIGS. 3A and 3B are flow charts showing the control method for a digital satellite broadcast receiver having a simultaneous multi-channel search function according to the present invention.

The operation of the present invention for simultaneously displaying the multi-channel programs on one screen according to the present invention will now be described referring to the flow charts.

At a step 301, the user inputs a transponder selection command through the remote hand set 90 and the remote interface section 80 to control the channel section 10 so as to select the transponder. A transport stream which has been received from the transponder is outputted to the demultiplexer 20 in the form of MPEG II data.

At a step 302, PSI data of the transport stream are received from the demultiplexer 20, thereby setting windows corresponding to the number of the program channels. At a step 303, the demultiplexer 20 is controlled so that particular program channel data would be selected and outputted. At a step 304, a picture coding type of the picture header is read. At a step 305, a judgment is made as to whether the picture coding type is an I picture (intra-picture). If the picture coding type is not an I picture, then the window number and the program channels are incremented by "1" at a step 306, and the procedure from the step 304 is repeated. In the case where the picture coding type is an I picture, the system proceeds to a step 307 at which the I picture data of the program channel are stored in the relevant area of the first memory section 40 corresponding to the relevant window.

At a step 308, the I picture data are read from the first memory section 40, and they are converted into TV broadcasting signals by the video encoder 50, so that they can be displayed on the relevant window of the cathode ray tube of a TV.

At a step 309, a judgment is made as to whether the program channels selected for reading the I pictures are larger than the maximum number of the windows. In the case where the channel number is larger than the windows number, the window number and the program channels are incremented by "1" at a step 306, and then, the procedure from the step 304 is repeated.

On the other hand, in the case where the channel number is not larger than window number, the system proceeds to a step 310.

At the step 310, a judgment is made as to whether a channel switch key is inputted from the remote hand set 90 (for example, the case where a cursor moving key of the remote controller is pressed so as to position the cursor 23 to the window (CH #1) displaying the program channel 1, and a channel switch key is inputted).

In the case where no channel switch key is inputted, the procedure of the steps 303 to 309 is repeated. On the other hand, in the case where a channel switch key is inputted, the system proceeds to a step 311 at which the channels selected by the cursor 23 are displayed on the total screen.

That is, in the case where the cursor 23 is positioned on the window CH#1 displaying the program channel 1, and the channel switch key is inputted, the program channel 1 which has been displayed on the window CH#1 is displayed on the total screen 21.

At a step 312, a judgment is made as to whether a transponder selection is inputted. If a transponder selection key is not inputted, the procedure from the step 310 is repeated. On the other hand, if a transponder selection key is inputted, the procedure from the step 301 is repeated.

According to the present invention as described above, without increasing the capacity of the video storing memory, programs of a plurality of channels can be displayed on one screen, so that a plurality of channels can be simultaneously searched, and that a plurality of channels can be simultaneously watched, thereby providing a convenience.

What is claimed is:

1. A digital satellite broadcast receiver having a simultaneous multi-channel search function, comprising:

a channel section for channel-selecting and receiving radio frequency signals from a satellite, and for converting the received radio frequency signals into digital signals so as to output a transport stream in a form of MPEG II data;

a demultiplexer for extracting program specific information (PSI) from among the data of the transport stream output of the channel section so as to select and output video data of channels in a sequential and repetitive manner;

a video decoder for selecting only I picture data from the video data output of the demultiplexer, and for decoding the I picture data;

a first memory section for storing the decoded I picture data of the video decoder;

a video encoder for converting the decoded I picture data of the video decoder into TV signals;

an interface section for outputting command data;

a control section for dividing a screen into as many windows as the channels of the video data output of the demultiplexer to display the TV signals of the I picture data in the windows respectively, and to display a cursor-located program in one of the windows on the total screen in accordance with the command data; and a second memory section for storing a management program and control data of said control section.

2. The digital satellite broadcast receiver as claimed in any one of claim 1, wherein the control section reads a picture coding type of a picture header of the transport stream to select the I picture data to display.

3. A control method for a digital satellite broadcast received having a simultaneous multi-channel search function, comprising the steps of:

receiving a transponder command through a remote interface section from a user, and selecting a transponder in accordance with the transponder command;

analyzing program specific information (PSI) of a transport stream transmitted from the selected transponder for a number of channels therein;

dividing a screen into as many windows as to the number of channels;

reading a picture coding type form the transport stream so as to select I pictures therefrom;

displaying the I pictures of respective ones of the channels respectively in the windows; and displaying on all of the screen the I pictures of one of the channels selected by a switch key from among the I pictures in the windows.

* * * * *